(12) United States Patent
Talghader et al.

(10) Patent No.: US 10,962,474 B2
(45) Date of Patent: Mar. 30, 2021

(54) OPTICAL ABERRATION DETECTION SYSTEMS

(71) Applicant: Regents of the University of Minnesota, Minneapolis, MN (US)

(72) Inventors: Joseph Talghader, Edina, MN (US); Merlin Lyn Mah, Shoreview, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 19 days.

(21) Appl. No.: 16/422,529

(22) Filed: May 24, 2019

(65) Prior Publication Data
US 2019/0360927 A1 Nov. 28, 2019

Related U.S. Application Data

(60) Provisional application No. 62/676,105, filed on May 24, 2018.

(51) Int. Cl.
*G01N 21/41* (2006.01)
*G01J 9/00* (2006.01)
(Continued)

(52) U.S. Cl.
CPC ............ *G01N 21/41* (2013.01); *G01J 9/00* (2013.01); *G01M 9/06* (2013.01);
(Continued)

(58) Field of Classification Search
CPC . G01W 2001/003; G01N 21/21; G01N 21/25; G01N 21/27; G01N 21/41;
(Continued)

(56) References Cited

U.S. PATENT DOCUMENTS 3,540,829 A * 11/1970 Collinson ............... G01S 17/95
356/129
3,567,915 A * 3/1971 Altshuler .................. G01S 1/72
702/49
(Continued)

OTHER PUBLICATIONS

Azar, Z. et al., "Aperture averaging of the two-wavelength intensity covariance function in atmospheric turbulence," Applied Optics, vol. 24, No. 15, pp. 2401-2407. (Year: 1985).*
(Continued)

*Primary Examiner* — Gordon J Stock, Jr.
(74) *Attorney, Agent, or Firm* — Shumaker & Sieffert, P.A.

(57) ABSTRACT

A system includes a detector and a computing device communicatively coupled to the detector. The detector detects spatial or temporal spectral features of a light beam after transmission of the light beam through a turbulent or aberrated medium and generate a measurement signal indicative of the spectral feature. The computing device receives the measurement signal and a comparative signal indicative of a spectral feature of the light beam prior to or after transmission of the light beam through the medium. The computing device compares the measurement signal and the comparative signal and determines, based on the comparison of the measurement signal and the comparative signal, one or more values related to variations in refractive indices of the medium.

31 Claims, 9 Drawing Sheets

(51) Int. Cl.
*G01M 9/06* (2006.01)
*G01P 5/26* (2006.01)
*G01N 21/21* (2006.01)
*G01W 1/00* (2006.01)
*G01M 11/02* (2006.01)

(52) U.S. Cl.
CPC ............ *G01N 21/4133* (2013.01); *G01P 5/26* (2013.01); *G01M 11/0242* (2013.01); *G01N 21/21* (2013.01); *G01N 2021/4106* (2013.01); *G01N 2201/0616* (2013.01); *G01N 2201/06113* (2013.01); *G01W 2001/003* (2013.01)

(58) Field of Classification Search
CPC .. G01N 21/4133; G01N 21/45; G01N 21/455; G01N 2021/4106; G01N 2021/4113; G01N 2021/416; G01N 2021/4173; G01N 2021/418; G01N 2021/4186; G01N 2021/4156; G01N 2201/06113; G01N 2201/0616; G02B 26/00; G02B 26/001; G02B 26/002; G02B 26/007; G02B 26/02; G02B 26/06; G02B 27/0025; G02B 5/284; G02B 7/185; G01J 2009/002; G01J 2009/004; G01J 11/00; G01J 4/00; G01J 4/02; G01J 4/04; G01J 2004/001; G01J 2009/0249; G01J 2009/0253; G01J 2009/0257; G01J 2009/0261; G01J 2009/0265; H04N 5/357; H04N 5/3572; H04N 5/35721; G01B 9/02034; G01B 9/02039; G01B 9/02041; G01B 9/02045; G01B 9/0201; G01B 9/02011; G01B 9/02012; G01B 9/02023; G01B 9/02024; G01B 9/02029; G01M 9/065; G01M 9/067; G01M 11/00; G01M 11/005; G01M 11/02; G01M 11/0207; G01M 11/0228; G01M 11/0235; G01M 11/0242; G01P 5/26; G06T 2207/20172; G06T 2207/20182; G06T 2207/20201; G06T 5/003

See application file for complete search history.

(56) References Cited

U.S. PATENT DOCUMENTS

| | | | | |
|---|---|---|---|---|
| 4,099,878 A * | 7/1978 | Lee | ........................ | G01N 21/41 250/338.1 |
| 4,195,931 A * | 4/1980 | Hara | ........................ | G01J 3/26 356/454 |
| 4,210,400 A * | 7/1980 | Misek | ........................ | G01J 9/04 356/450 |
| 4,303,862 A * | 12/1981 | Geiger | ................... | G01S 17/95 250/372 |
| 4,725,138 A * | 2/1988 | Wirth | ....................... | G02B 26/06 250/208.5 |
| 5,083,015 A * | 1/1992 | Witthoft | ................. | G02B 26/06 250/201.9 |
| 5,120,128 A * | 6/1992 | Ulich | ........................ | G01J 9/00 250/201.9 |
| 5,150,171 A * | 9/1992 | Hill | .......................... | G01N 21/41 356/128 |
| 5,278,402 A * | 1/1994 | Wein | ....................... | G01N 21/41 250/201.9 |
| 5,303,024 A * | 4/1994 | Thierman | ............... | G01N 21/41 250/225 |
| 5,394,238 A * | 2/1995 | Mocker | ................... | G01S 7/484 356/342 |
| 5,838,007 A * | 11/1998 | Wang | ...................... | G01N 21/41 250/338.5 |
| 7,274,442 B2 * | 9/2007 | Dolne | ....................... | G01J 9/00 250/201.9 |
| 7,295,292 B1 * | 11/2007 | Jumper | ..................... | G01J 9/00 250/201.9 |
| 7,933,002 B2 * | 4/2011 | Halldorsson | ............ | G01S 17/95 356/28 |
| 9,924,138 B1 * | 3/2018 | Brown | ...................... | H04N 5/33 |
| 10,401,222 B1 * | 9/2019 | Land | ....................... | G06T 5/001 |
| 2004/0124335 A1 * | 7/2004 | Cicchiello | ................. | G01J 9/00 250/201.9 |
| 2007/0278386 A1 * | 12/2007 | Paxman | ............... | H04N 5/3572 250/208.1 |
| 2009/0310118 A1 * | 12/2009 | Halldorsson | .............. | G01P 5/26 356/28 |
| 2010/0192709 A1 * | 8/2010 | Wilcox | ................... | G01N 21/01 73/865.6 |
| 2019/0277758 A1 * | 9/2019 | Wayne | ................... | G01N 21/41 |

OTHER PUBLICATIONS

Rocca, A. et al., "Detection of atmospheric turbulent layers by spatiotemporal and spatioangular correlation measurements of stellar-light scintillation," Journal of the Optical Society of America, vol. 64, No. 7, pp. 1000-1004. (Year: 1974).*

Liu et al., "Spatial-Mode Analysis of Micromachined Optical Cavities Using Electrothermal Mirror Actuation," Journal of Microelectromechanical Systems, vol. 15, No. 4, Aug. 2006, 9 pp.

Trappe et al., "The Gaussian beam mode analysis of classical phase aberrations in diffraction-limited optical systems," Institute of Physics Publishing, European Journal of Physics, vol. 24, Jun. 23, 2003, 11 pp.

Telnov et al., "High-order-harmonic generation by Laguerre-Gaussian laser modes: Control of the spectra by manipulating the spatial medium distribution," Physical Review A, vol. 96, Sep. 6, 2017.

Mah et al., "Alteration by Repeated Electrostatic MEMS Actuation of the Thermoluminescence of Thin Films," 2013 International Conference on Optical MEMS and Nanophotonics (OMN), Aug. 2013, 2 pp.

Vdovin et al., "Flexible reflecting membranes micromachined in silicon," Semiconductor Science and Technology, vol. 9, No. 8, Jul. 4, 1994, 3 pp.

Dayton et al., "Novel micromachined membrane mirror characterization and closed-loop demonstration," Optics Communications 200, Dec. 15, 2001, 7 pp.

Mah et al., "Spectral Decomposition of Aberrated Wavefronts from Actuated Micromirrors," IEEE Optical MEMS and Nanophotonics Conference, Lausanne Switzerland, Jul. 29-Aug. 2, 2018, 2 pp.

Wyant et al., "Basic Wavefront Aberration Theory for Optical Metrology, Applied Optics and Optical Engineering," vol. XI, Academic Press, Inc., Applicant points out, in accordance with MPEP 609.04(a), that the year of publication, 1992, is sufficiently earlier than the effective U.S. filing date, so that the particular month of publication is not in issue, 64 pp.

Gage et al.. "Doppler Radar Probing of the Clear Atmosphere," Bulletin American Meteorological Society, vol. 59, No. 9, Sep. 1978, 21 pp.

Voulgaris et al., "Evaluation of the Acoustic Doppler Velocimeter (ADV) for Turbulence Measurements," American Meteorological Society, Journal of Atmospheric and Oceanic Technology, vol. 15, Mar. 26, 1997, 18 pp.

Duvvuri et al., "Spectral Turbulence Measurements Using Nano-Scale Sensors in a Compressible Boundary Layer," 16th European Turbulence Conference, Aug. 21-24, 2014, Stockholm, Sweden, 1 pp.

* cited by examiner

OPTICAL ABERRATION DETECTION SYSTEMS

This application claims the benefit of priority to U.S. Provisional Patent Application No. 62/676,105, titled, "OPTICAL ABERRATION DETECTION SYSTEMS," filed May 24, 2018, which is incorporated herein by reference in its entirety.

GOVERNMENT INTEREST

The invention was made with government support under N00014-17-1-2438 awarded by the Joint Transition Office of Naval Research. The government has certain rights in the invention.

TECHNICAL FIELD

The present disclosure relates to optical aberration detection systems.

BACKGROUND

Turbulence in a fluid medium due to variations in local temperature, density, humidity, flow resistance, and other factors may cause fluctuations in the index of refraction of the fluid medium. Turbulence can occur in any fluid medium, such as the atmosphere, oceans, rivers, and others. An optical wave propagating through a turbulent medium may become aberrated, such that an initial wavefront of the optical wave may become distorted. For example, the unaberrated optical wave can take many forms, but is usually approximated as a plane wave or Gaussian beam. However, the distorted wave front may have no pre-specified form, but may be, for example, decomposed into a series of Zernike polynomials, a set of mathematical functions that are orthogonal over a circular aperture. Each of these polynomials can be considered a specific aberration. In some instances, there is a partial, non-orthogonal set of aberrations, known as the Seidel aberrations, that may include astigmatism, coma, spherical aberration, field curvature, and distortion. Low order Zernike polynomials may contain aspects of these aberrations but are not identical.

In one method of turbulence measurement, turbulence may be simplified as the result of localized fluctuations in temperature, which may be quantitatively linked to refractive index changes through Kolmogorov theory. Measuring these fluctuations may be mechanically accomplished with a pair of sensitive thermometers, such as fine platinum wires, placed close together. Other methods may be used in astronomy, oceanography, meteorology, and aviation. For example, a Shack-Hartmann sensor or similar wave front sensor may be used for adaptive optics when paired with a laser-induced artificial guide star. In some instances, fluctuations in moiré fringe patterns could accomplish similar wave front imaging. Acoustic/sonar, radar, and laser Doppler velocimeters may be used in underwater and atmospheric turbulence measurements. Schlieren phase-contrast imaging provides the archetypal "shadowgraph" images of flowing air in wind tunnels and other controlled-illumination environments.

SUMMARY

The present disclosure describes techniques for detecting optical wavefront aberrations caused by spatial and/or temporal variations in a medium. A light beam that passes through a medium may become distorted by spatial and/or temporal variations in refractive indices in the medium. These variations in refractive indices may be due to turbulence in a fluid medium, surface defects in a lens medium, or the like. For example, prior to transmission through the medium, the light beam may have a narrow band of wavelengths and/or small spatial variation in phases; after transmission through the medium, the light beam may be distorted with a wider band of wavelengths and/or a greater spatial variation in phases. These spectral features of the light beam after passing through the medium may represent or correlate to the spatial or temporal variations in refractive indices of the medium.

A system for detecting optical aberrations may include a detector and a computing device configured to detect and/or measure the variations in refractive indices. The detector may receive a light beam after transmission through a medium and detect one or more spatial or temporal spectral features of the light beam, such as an intensity of the light beam, a spectral range of frequencies of the light beam, or other spectral characteristics of the light beam that may change due to passage of the light beam through the medium. The detector may generate a measurement signal indicative of the spectral feature and output the measurement signal to the computing device. The computing device may receive the measurement signal and a comparative signal indicative of the light beam prior to or after transmission through the fluid medium. For example, the comparative signal may include an output of the light source or a measurement signal indicative of a spectral feature from a filtered light beam after transmission through the fluid medium. The computing device may compare the measurement signal and the comparative signal to determine changes in the spectral features, such as an intensity of the light beam or spectral distribution of the light beam, due to transmission of the light beam through the medium. The computing device may determine, based on the comparison of the measurement signal and the comparative signal, one or more values related to variations in refractive indices of the medium and output the one or more values, such as to an optical control system or turbulence instrumentation.

In this way, the systems described herein may provide real-time measurements of optical aberrations caused by variations in mediums. For example, a turbulence detection system may receive real-time turbulence measurements for use in navigational equipment. As another example, a telescope may receive real-time error measurements, such as related to thermal expansion, that may be used to correct optical components of the telescope.

In one example, a system includes a detector and a computing device. The detector is configured to detect a spatial or temporal spectral feature of a light beam after transmission of the light beam through a turbulent or aberrated medium and generate a measurement signal indicative of the spectral feature. The computing device is configured to receive the measurement signal and receive a comparative signal indicative of a spectral feature of the light beam prior to or after transmission of the light beam through the medium. The computing device is further configured to compare the measurement signal and the comparative signal and determine, based on the comparison of the measurement signal and the comparative signal, one or more values related to variations in refractive indices of the medium.

In one example, a method includes detecting, using a detector, a spatial or temporal spectral feature of a light beam after transmission through a turbulent or aberrated medium and generating, by the detector, a measurement signal indicative of the spectral feature of the light beam after transmission through the medium. The method further includes receiving, by a computing device, the measurement signal and a comparative signal indicative of a spectral feature of the light beam prior to or after transmission of the light beam through the medium. The method further includes comparing, by the computing device, the measurement signal and the comparative signal and determining, by the computing device and based on the comparison of the measurement signal and the comparative signal, one or more values related to variations in refractive indices of the medium.

In one example, a system includes a detector and a computing device. The detector is configured to detect a polarization feature of a light beam after transmission through a turbulent or aberrated medium and generate a measurement signal indicative of the polarization feature. The computing device is configured to receive the measurement signal and a comparative signal indicative of a polarization feature of the light beam prior to or after transmission of the light beam through the medium. The computing device may be further configured to compare the measurement signal and the comparative signal and determine, based on the comparison of the measurement signal and the comparative signal, one or more values related to variations in refractive indices of the medium.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
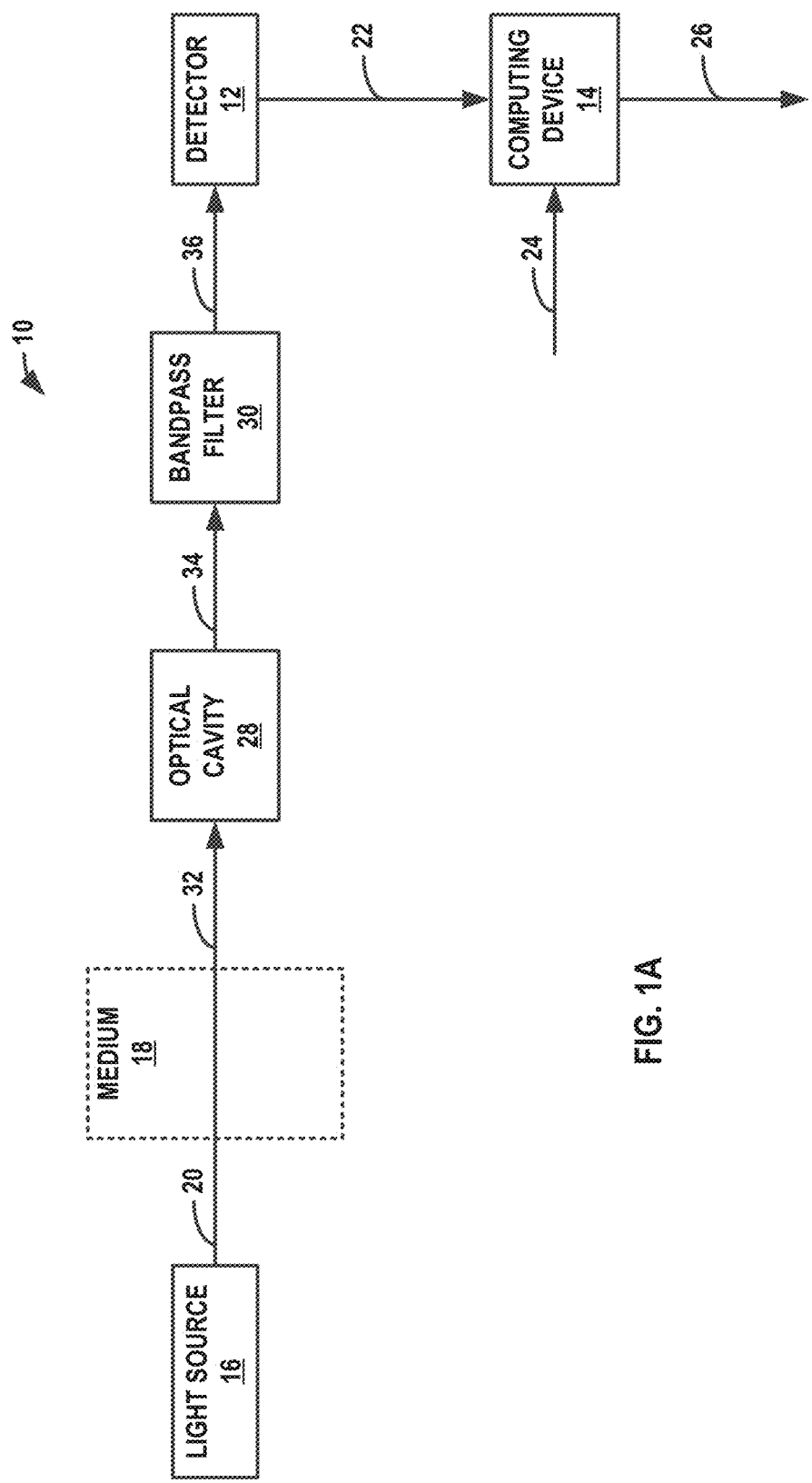
FIG. 1A is a diagram illustrating an example system for detecting optical aberrations.

FIG. 1A is a diagram illustrating an example system 10 for detecting optical aberrations caused by variations in a medium 18. System 10 includes detector 12, computing device, and optionally light source 16. Light source 16 may be configured to generate a light beam 20 for transmission through medium 18. In some examples, light source 16 may be a narrowband laser configured to emit a narrow band of frequencies, such as for temporally-varying turbulence, while in other examples, light source 16 may be broadband laser configured to emit a wide band of frequencies, such as for spatially-varying turbulence. In some examples, light source 16 may be an ambient light source, such as background light. Medium 18 may be any medium through which light beam 20 may be transmitted, including fluid mediums, such as an atmosphere, the ocean, etc., and solid mediums, such as lenses or other optical components.

As light beam 20 propagates through medium 18 having a spatially and/or temporally varying index of refraction, light beam 20 will develop phase, or wavefront, variations due to a change in temporal or spatial distribution of energy. These phase variations may modify the spatial or temporal spectrum of light beam 20 as light beam 20 propagates through medium 18. For example, temporal variations may broaden a number of wavelengths of light beam 20, while spatial variations may change a structure (phase, spatial modes, angular plane wave spectrum, or the like) of light beam 20. After transmission through medium 18, light beam 20 (e.g., aberrated light beam 32) may include one or more spectral features caused by the phase variations imparted to light beam 20 by medium 18. Spectral features may include any change in a temporal or spatial mode spectrum of light beam 20, such as an intensity or power of light beam 20 at various spatial or temporal frequencies, caused by varying indices of refraction of medium 18.

In some examples, turbulence may at least partially cause spatial and temporal phase variations of light beam 20. As such, turbulence in medium 18 may induce the one or more spatial or temporal spectral features of light beam 20 as light beam 20 propagates through medium 18. As another example, rather than a fluid medium, medium 18 may include a solid medium, such as a mirror of an optical cavity that creates optical aberrations, such as stress-induced aberrations, that results in a light beam having distinctive spatial or temporal spectral features that differ significantly from the spatial or temporal spectral features of light beams from optical cavities with perfect or near-perfect mirrors.

Detector 12 may be optically coupled to medium 18, such that light beam 20 passing through medium 18 may be incident on an aperture or other optical opening of detector 12. Detector 12 may be configured to receive light beam 20 after transmission through medium 18. A variety of detectors may be used including, but not limited to, a photodetector, a spectrometer, a filter, a monochromator, a diffraction grating, an optical cavity, and any other detector capable of detecting a spectral feature of light beam 20.

Detector 12 is configured to detect a spectral feature of light beam 20 after transmission through medium 18. A spectral feature may be any measurable characteristic of a spectrum of light beam 20 that changes with frequency including, but not limited to, an intensity of light beam 20, a spatial or temporal spectral distribution of light beam 20, and the like. For example, detector 12 may detect an intensity of light beam 20 at a particular wavelength or over a range of wavelengths.

Detector 12 is configured to generate a measurement signal 22 indicative of the spatial or temporal spectral feature. For example, detector 12 may generate a measurement signal that is proportional to a normalized intensity of the light beam or a measurement signal that forms a waveform that represents the intensity of the light beam at various frequencies. Detector 12 may be configured to output measurement signal 22, such as to computing device 14.

Figure 2:
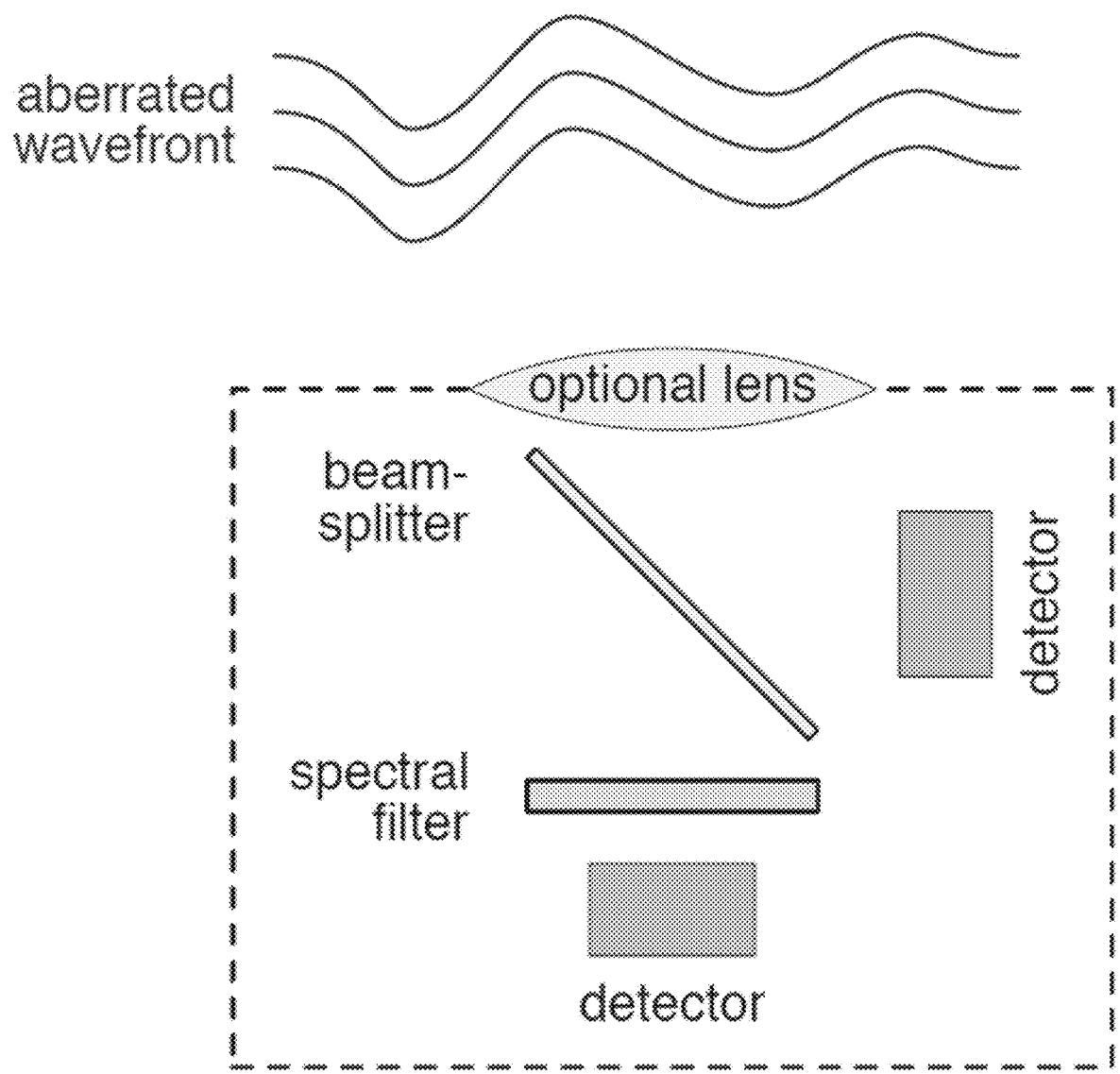
FIG. 2 is a diagram illustrating an example system for detecting optical aberrations using a spectral filter.
Figure 3A:
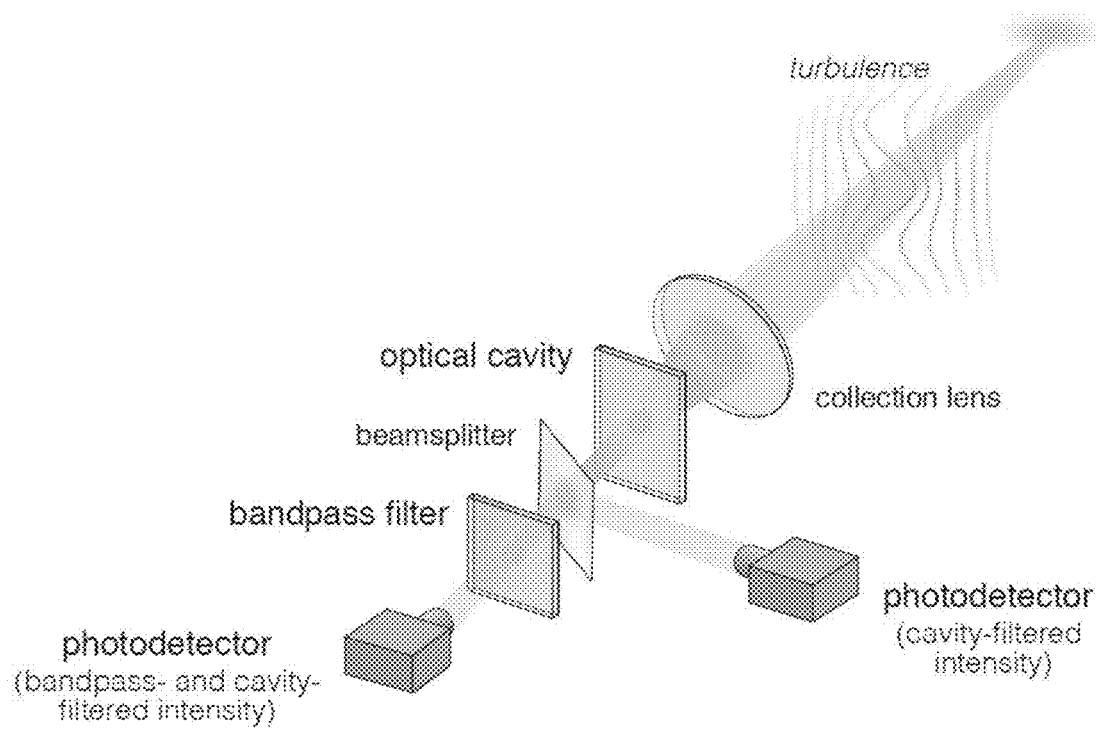
FIG. 3A is a diagram illustrating an example system for detecting optical aberrations using an optical cavity and bandpass filter.

System 10 may include optical devices for further analyzing spatial or temporal spectral features of light beam 20 prior to and/or after transmission of light beam 20 through medium 18. In some examples, system 10 includes a spectral filter, such as shown in FIGS. 2 and 3A. The spectral filter may be configured to receive a portion of light beam 20 after transmission of light beam 20 through medium 18, substantially transmit light from the portion of light beam 20 within a spectral range or ranges (i.e. range or ranges of frequencies or wavelengths), and substantially block light from the portion of light beam 20 outside the spectral range or ranges. A spectral range of the spectral filter may be selected based on factors such as a reference spectrum of light beam 20 prior to transmission through medium 18. In the example of FIG. 1A, spectral filters include an optical cavity 28 and a bandpass filter 30; however, in other examples, other spectral filters may be used, only one of optical cavity 28 or bandpass filter 30 may be used, or the like.

Figure 4A:
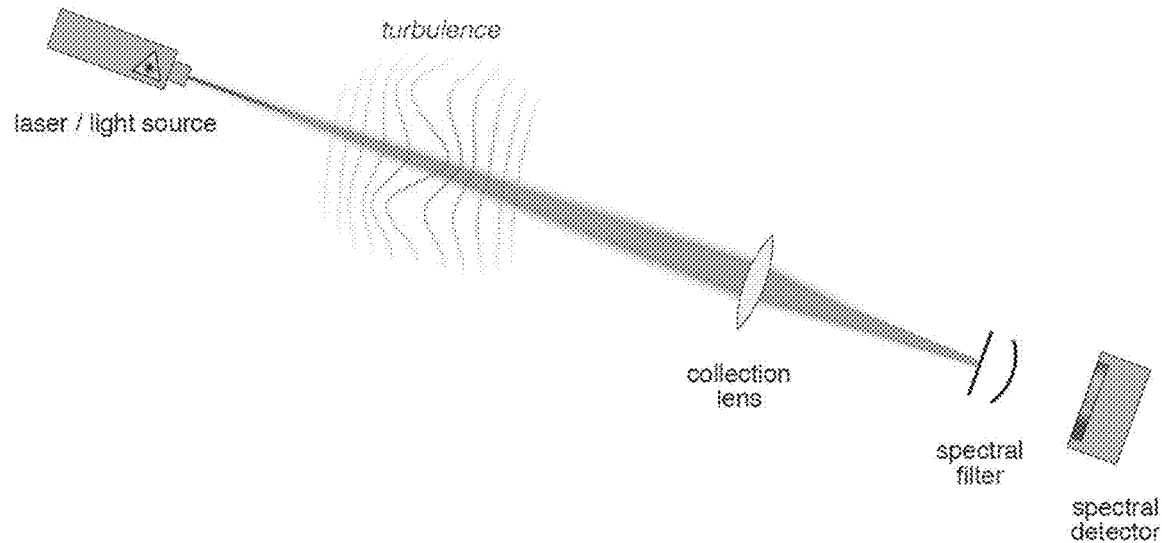
FIG. 4A is a diagram illustrating an example system for detecting optical aberrations using an optical resonator.

In some examples, system 10 includes optical cavity 28 configured to split light beam 20 (e.g., aberrated light beam 32) into one or more spectral frequencies (e.g., cavity filtered light beam 34). Detector 12 may be configured to detect an intensity of each of the one or more spectral frequencies. In some examples, the optical cavity is a resonant optical cavity, such as in a resonator, as shown in FIG. 4A, and the one or more spectral frequencies are resonant frequencies of the resonant optical cavity. For example, optical cavity 28 may have a number of longitudinal and spatial modes having resonant frequencies determined by phase delay inherent in optical cavity 28. As a result, optical cavity 28 may filter aberrated light beam 32 to produce a cavity-filtered light beam 34 that includes intensities at the various spatial modes. The magnitude of these intensities and distribution of these spatial modes may indicate various spatial aberrations of aberrated light beam 32. Detector 12 may be configured to detect an intensity of each or an aggregate of the one or more resonant frequencies.

In some examples, system 10 includes a bandpass filter 30 configured to filter various frequencies of light beam 20 (e.g., aberrated light beam 32 or cavity-filtered light beam 34). For example, for aberrated light beam 32 caused by temporal aberrations, aberrated light beam 32 may have a broadened spectrum of wavelengths as light beam 20 prior to transmission through medium 18. In this instance, bandpass filter 30 may be configured to filter wavelengths outside a particular band of wavelengths to produce a bandpass-filtered light beam 36. Compared to light beam 20 prior to transmission through medium 18, bandpass-filtered light beam 36 may have a reduced intensity due to the filtered-out light. As temporal aberration increases, an amount of light that is filtered-out by bandpass filter 30 may increase due to a wider band of wavelengths. As such, a ratio of intensity of bandpass-filtered light beam 36 to light beam 20 prior to transmission through medium 18 may indicate characteristics of temporal turbulence or aberrations in medium 18.

Figure 1B:
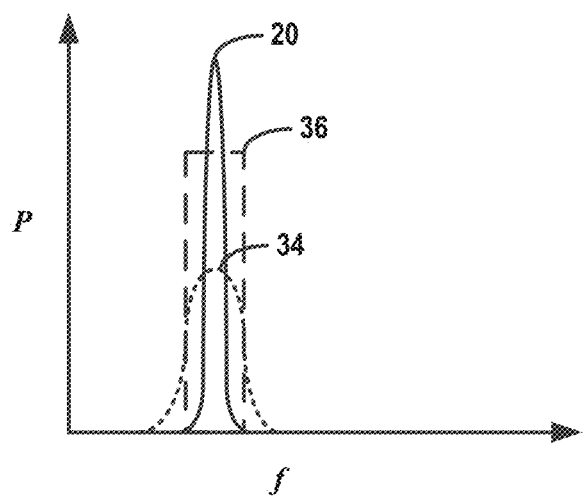
FIG. 1B is a graph of an intensity spectrum of a light beam after bandpass filtering to detect temporal aberrations.

FIG. 1B is a graph of an intensity spectrum of a light beam after bandpass filtering to detect temporal aberrations. As shown in FIG. 1B, light beam 20 may have a narrow band of wavelengths prior to transmission through medium 18. However, temporal aberrations in medium 18 may cause aberrated light beam 34 to have a wider band of wavelengths. Bandpass filter 30 may filter out frequencies to produce bandpass-filtered light beam 36 that indicates, such as through individual or aggregate intensities, characteristics of temporal turbulence or aberrations in medium 18.

Referring back to FIG. 1A, as another example, for aberrated light beam 32 caused by spatial aberrations, aberrated light beam 32 may have a broadened spectrum of spatial modes compared to light beam 20 prior to transmission through medium 18 due to phase variations cause by turbulence in medium 18. In this instance, bandpass filter 30 may be configured to filter wavelengths outside a particular band of resonant frequencies corresponding to the spatial modes to produce a (cavity-filtered and) bandpass-filtered light beam 36. Compared to light beam 20 prior to transmission through medium 18, cavity-filtered and bandpass-filtered light beam 36 may have a reduced intensity due to the filtered-out light. As spatial aberration increases, an amount of light that is filtered-out by bandpass filter 30 may increase due to a wider band of resonant frequencies. As such, a ratio of intensity of bandpass-filtered light beam 36 to light beam 20 prior to transmission through medium 18 may indicate characteristics of spatial turbulence or aberrations in medium 18.

Figure 1C:
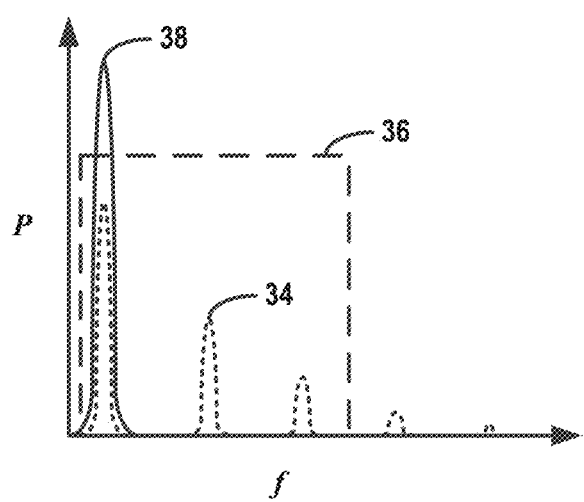
FIG. 1C is a graph of an intensity spectrum of a light beam after optical cavity and bandpass filtering to detect spatial aberrations.

FIG. 1C is a graph of an intensity spectrum of a light beam after optical cavity and bandpass filtering to detect spatial aberrations. As shown in FIG. 1C, cavity-filtered unaberrated light beam 38 prior to transmission through medium 18 may have essentially a single spatial mode corresponding to a resonant frequency prior to transmission through medium 18. However, spatial aberrations in medium 18 may cause aberrated light beam 34 to have a wider band of spatial modes than cavity-filtered unaberrated light beam 38. Bandpass filter 30 may filter out frequencies to produce cavity-filtered and bandpass-filtered light beam 36 that indicates, such as through individual or aggregate intensities, characteristics of spatial turbulence or aberrations in medium 18.

Referring back to FIG. 1A, in some examples, detector 12 may include multiple detectors, such as shown in FIGS. 2 and 3A. For example, in examples in which detector 12 includes a spectral filter, detector 12 may include a first detector configured to detect a spectral feature of a first, unfiltered portion of light beam 20. The first, unfiltered portion of light beam 20 may correspond to a whole-spectrum comparative signal. Detector 12 may include a second detector configured to detect a spectral feature of a second, filtered portion of light beam 20. The second, filtered portion of light beam 20 may correspond to a frequency-filtered measurement signal. For example, the spectral feature of light beam 20 after transmission through medium 18 may include an intensity of light beam 20 after transmission through medium 18, while the spectral feature of light beam 20 prior to transmission through medium 18 may include an intensity of light beam 20 prior to transmission through medium 18.

Detector 12 may include other optical components for manipulating light. In some examples, detector 12 may include a light distribution device configured to direct a first portion of light beam 20 to a first detector of detector 12 and a second portion of light beam 20 to a spectral filter. The light distribution device may include, for example, a beam splitter. In some examples, detector 12 may include a collection lens configured to concentrate light beam 20 to detector 12 or a light distribution device after transmission of light beam 20 through medium 18.

Computing device 14 is configured to receive measurement signal 22 and a comparative signal 24 indicative of light beam 20 prior to transmission through medium 18. Computing device 14 may be configured to receive measurement signal 22 at a variety of schedules. For example, turbulence may cause properties of spectral features to be dynamic, such that detector 12 may measure the spectral feature of light beam 20 once or many times, and each new measurement signal generated may reflect any changes in turbulence. For example, the Greenwood frequency, which is small (i.e. slow) by optical and electronic standards, may be used to describe how quickly turbulence causes optical changes. In some examples, detector 12 might measure once (or once and hour or so) and be done, such as if a party is merely interested in the turbulence over the ocean for weather and visibility purposes. However, if a party is using system 10, for example, to take corrective action on turbulence, such as in a plane, telescope, or directed energy system, then several or more measurements per second may be made by detector 12 and received by computing device 14.

Computing device 14 is configured to compare measurement signal 22 and comparative signal 24. For example, a change in spectral features may be used to infer the magnitude and other properties of the refractive index variations, and thus the turbulence itself. The comparison of measurement signal 22 and comparative signal 24 may represent a determination of a change in spectral features of light beam 20 from transmission of light beam 20 through medium 18. For example, the comparison of measurement signal 22 and comparative signal 24 may include a ratio of the normalized intensity of a spectral feature of light beam 20 after transmission through medium 18 to the normalized intensity of a spectral feature of light beam 20 prior to transmission through medium 18.

Computing device 14 is configured to determine, based on the comparison of measurement signal 22 and comparative signal 24, one or more values related to variations in refractive indices of medium 18. Values related to variation in refractive indices may include any values of properties of medium 18 that correspond to changes in spatial or temporal spectral features of light beam 20 prior to and after transmission through medium 18 including, but not limited to, magnitude, such as the size of eddies or other uniform index regions and the size of index variations of these regions; spatial distribution, such as the shapes of eddies or other uniform index regions, the distribution of eddies or other uniform index regions; temporal distribution, such as the propagation of eddies or other uniform index regions, the lifetime of eddies or other uniform index regions (e.g., from comparing signals over time), and other properties, such as wind speed and direction, air pressure, and the like. For example, differences in a magnitude, distribution, or other property of measurement signal 22 and comparative signal 24 may correlate to spatial, temporal, or other variations in refractive indices of medium 18. As an example, a spatial temperature difference in a fluid medium caused by turbulence may cause a wider spatial or temporal spectral distribution of light beam 20. The difference in the spectral distribution may be determined by computing device 14 through a difference between measurement signal 22, which has a wider spectral distribution (e.g., wavelengths or spatial modes), and comparative signal 24, which has a narrower spectral distribution. The difference may indicate simple information regarding medium 18, such as a presence of turbulence in medium 18, or more complex information regarding medium 18, such as a type of turbulence in medium 18. In some examples, the one or more values related to variations in refractive indices may represent statistical magnitude and distribution of variations in refractive indices. For example, an exact measurement of variations in refractive indices may not be made, as many index distributions may produce the same wavefront. As such, a resulting value may represent an approximation of a variation in refractive index.

Computing device 14 may determine the one or more values related to variation in refractive indices of medium 18 using a variety of techniques, such as by looking up correlations between differences in measurement signal 22 and comparative signal 24 to the one or more values, using the differences in measurement signal 22 and comparative signal 24 as inputs for algorithms or models used to compute the one or more values, and the like. For example, measurement signal 22 may be modeled as a weighted sum of orthonormal aberrations, such that the orthonormal aberrations may be further identified and used to determine spatial, temporal, and other characteristics related to variation of in refractive indices of medium 18. Computing device 14 may output, such as to an external computing device, graphical user interface, display, or other output, an output signal 26 indicative of the one or more values related to variation in refractive indices of medium 18.

In some examples, system 10 may be a turbulence detection system. For example, medium 18 may be a fluid medium that encounters turbulence from various sources. Computing device 14 may be configured to determine, based on variations in refractive indices of medium 18, one or more properties of turbulence of the fluid medium. The one or more properties of turbulence may include, but are not limited to, an intensity of the turbulence (e.g., refractive index structure parameter, $Cn^2$, or other quantitative measure of intensity of optical turbulence), a type of the turbulence, a size of eddies, Fried parameters, Greenwood frequencies, changes in density, stability of flow lines, onset of flow line detachment or stall, and analysis of vortices or lift.

In some examples, comparative signal 24 may be used to further correct for errors in detection of measurement signal 22. For example, changes in temperature of light source 16, detector 12, or other equipment may cause drift of a spectral range of light beam 20. The computing device may be configured to receive, from light source 16 of light beam 20, a reference frequency or range of frequencies of light beam 20 and adjust, based on the reference frequency or range of frequencies of light beam 20, measurement signal 22. In some examples, computing device is further configured to output, based on the reference frequency of light beam 20, a correction signal, such as output signal 26, configured to minimize a difference between a frequency, such as a median frequency, of measurement signal 22 and the reference frequency of light beam 20.

While system 10 of FIG. 1A has been described with respect to detecting optical aberrations through analysis of spectral features, in some examples, system 10 may use other properties of light for which changes in the properties may be used to determine changes in refractive indices of mediums and, correspondingly, causes such as turbulence and lens distortions.

In some examples, detector 12 may be configured to detect a polarization feature of light beam 20 after transmission through medium 18 and generate measurement signal 22 indicative of the polarization feature. A polarization feature of light beam 20 may be any polarization property that changes with phase or frequency including, but not limited to, polarization variations, phase, direction, geometric orientation, intensity, and the like.

In this example, computing device 14 may be configured to receive the measurement signal and a comparative signal indicative of a polarization feature of the light beam prior to transmission through the medium. Computing device 14 may compare the measurement signal and the comparative signal and determine, based on the comparison of the measurement signal and the comparative signal, one or more values related to variations in refractive indices of the medium. For example, computing device 14 may determine a change in the polarization feature of light beam 20 passing through medium 18 and correlate (e.g., by using a table), calculate (e.g., by using an equation or algorithm), or otherwise model (e.g., by using a statistical method) one or more values related to variations in refractive indices of medium 18.

In addition to spectral features and polarization features, phasic features and directions features may be measured for changes and used to determine changes in refractive indices of mediums. For example, phase may be measured directly using coherent imaging, such as with homodyne or heterodyne detection.

FIG. 2 is a diagram illustrating an example system for detecting optical aberrations using a spectral filter. In the example of FIG. 2, a light beam passing through the aberrated wavefront may be concentrated at an optional lens and split by a beamsplitter into a first portion and second portion. The first portion may be detected by a first detector. The second portion may be filtered by a spectral filter and detected by a second detector.

FIG. 3A is a diagram illustrating an example system for detecting optical aberrations using spectral filters that include an optical cavity and a bandpass filter. Operation of the example system of FIG. 3A may be similar to operation of the example system of FIG. 2 described above. The optical cavity may filter the light beam into various spatial modes, while the bandpass filter may filter the light beam into a bandwidth of spatial modes or wavelengths. The example system of FIG. 3A includes a photodetector configured to receive a first, cavity-filtered portion of the light beam to detect a reference intensity of resonant frequencies, such as the comparative signal described in FIG. 1A above. The example system of FIG. 3A may also include a photodetector configured to receive a second, cavity-filtered and bandpass-filtered portion of the light beam to detect intensity of filtered frequencies, such as measurement signal described in FIG. 1A above.

Figure 3B:
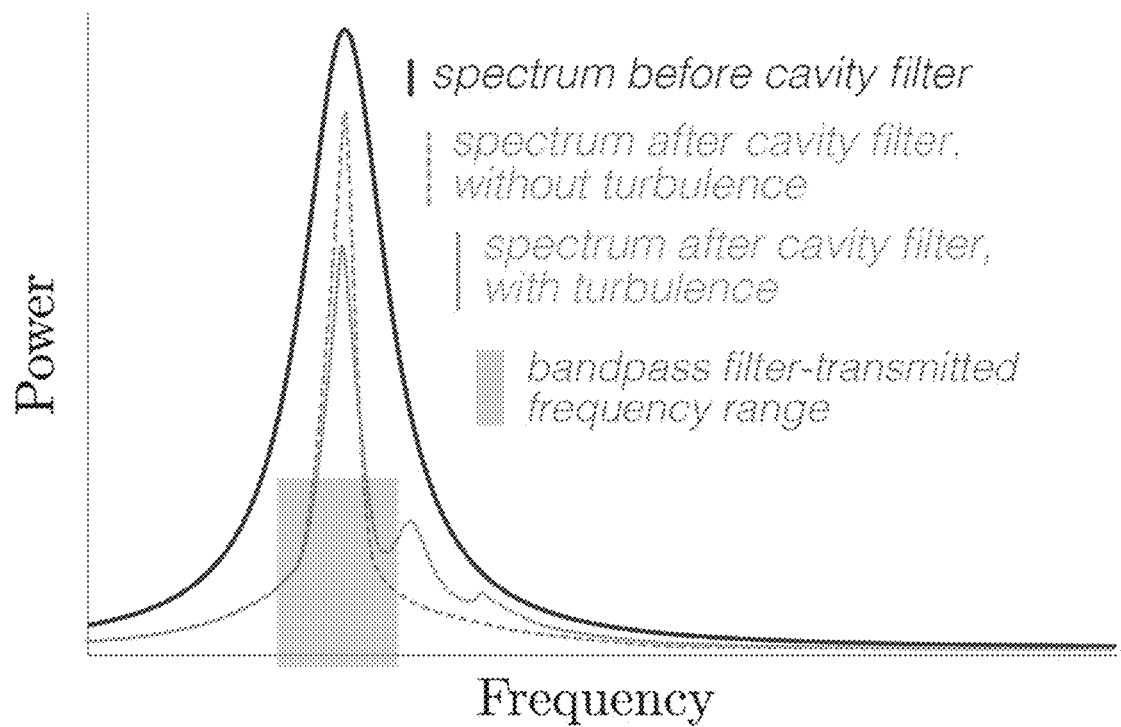
FIG. 3B is a graph of an intensity spectrum of a light beam at various points within the example system of FIG. 3A.

FIG. 3B is a graph of an intensity spectrum of a light beam prior to transmission through the turbulence and the optical cavity, a light beam prior to transmission through the turbulence and after transmission through the optical cavity beam, a light beam after transmission through the turbulence and the optical cavity, and a light beam after transmission through the turbulence, the optical cavity, and the bandpass filter. As seen in FIG. 3B, the original beam spectrum of the light beam exiting a light source and filtered through the optical cavity has a narrow frequency band. After transmission through the spectral filters, the light beam has a filtered intensity measurement that is limited.

FIG. 4A is a diagram illustrating an example system for detecting optical aberrations using an optical resonator and including a laser. The system of FIG. 4A includes an optional lens to collect a large amount of light and focus the collected light toward the detection system. Collected light is directed into one or more spectral filters including an optical resonator, which has inherent to it a number of excitable stable modes or standing-wave patterns, each mode or pattern correlated to one or more frequencies or spectral features. The collected light may excite a number of these modes, and thus make evident the corresponding spectral features in the light transmitted through the optical resonator. A spectral detector, for example one or more spectrally-filtered photodetectors, may then be used to measure the spectral features in the light transmitted through the optical resonator. From the measured spectrum, a computing device (not shown) may obtain significant information about the turbulence, including the intensity of the turbulence as described by the $C_n^2$ parameter for Kolmogorov theory. As explained in FIG. 1A above, other information could include types of turbulence, the size of eddies, Fried parameters, Greenwood frequencies, changes in density, stability of flow lines, onset of flow line detachment or stall, analysis of vortices or lift, and many others. In many of these embodiments, a more complex spectral analysis would be performed to gain additional information from the signal. For example, in FIG. 4A, a Fabry-Perot optical cavity is used to split the spectrum into spectral lines, which can be analyzed individually, in groups, or in aggregate to determine detailed characteristics of the turbulence.

Figure 4B:
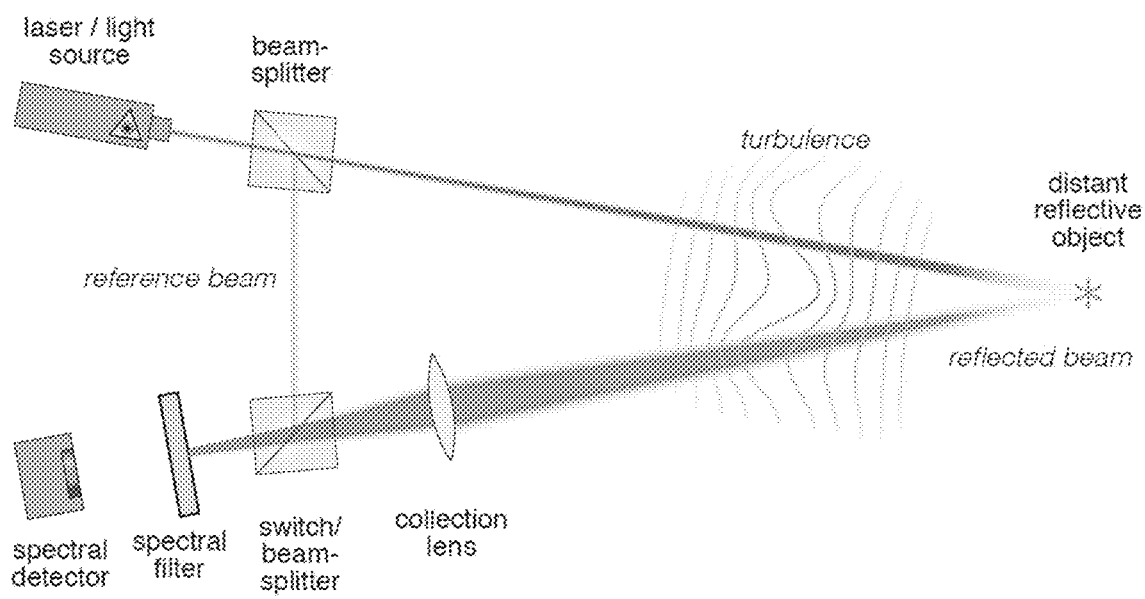
FIG. 4B is a diagram illustrating an example system for detecting optical aberrations using equipment positioned on a single side of a medium.

FIG. 4B is a diagram illustrating an example system for detecting optical aberrations using a reference beam and a spectral filter. In the example system of FIG. 4B, the laser and detector are at or near the same location and configured to direct a light beam to and receive an aberrated light beam from a distant reflective object. In this case, a small part of the source laser is tapped off and used as a reference as well. This embodiment may be especially useful when the center laser wavelength drifts with time due to changes in temperature or other factors. The reference beam allows the sensor to track this drift and adjust the filter response or analysis as necessary to adjust for the changes.

Figure 4C:
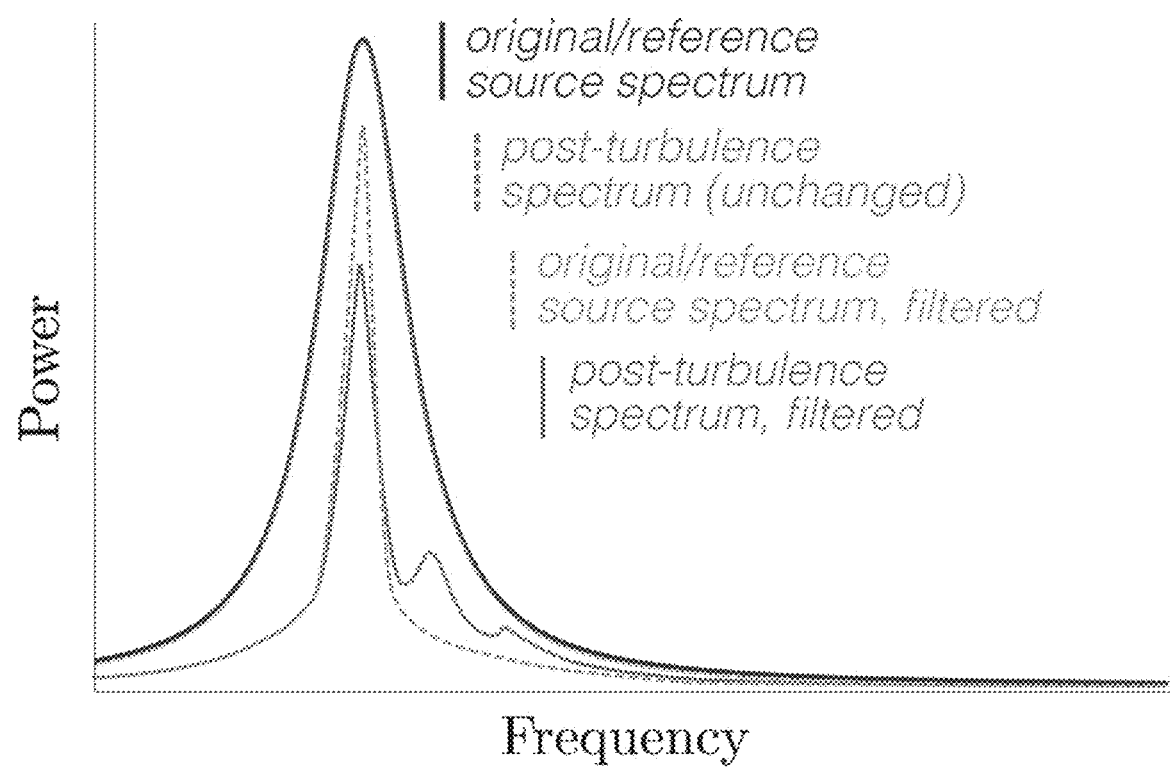
FIG. 4C is a graph of an intensity spectrum of a reference beam of the example systems of FIG. 4A or FIG. 4B.

FIG. 4C is a graph of an intensity spectrum of a reference beam of the example systems of FIG. 4A or FIG. 4B for spatial turbulence. An unaberrated light beam prior to transmission through the turbulence or spectral filters has an intensity and frequency within a relatively narrow band of frequencies that is unchanged after passing through turbulence. The unaberrated light beam, after passing through the spectral filters, has an intensity and frequency within a narrower band of frequencies compared to an aberrated light beam after passing through the spectral filters.

Figure 5:
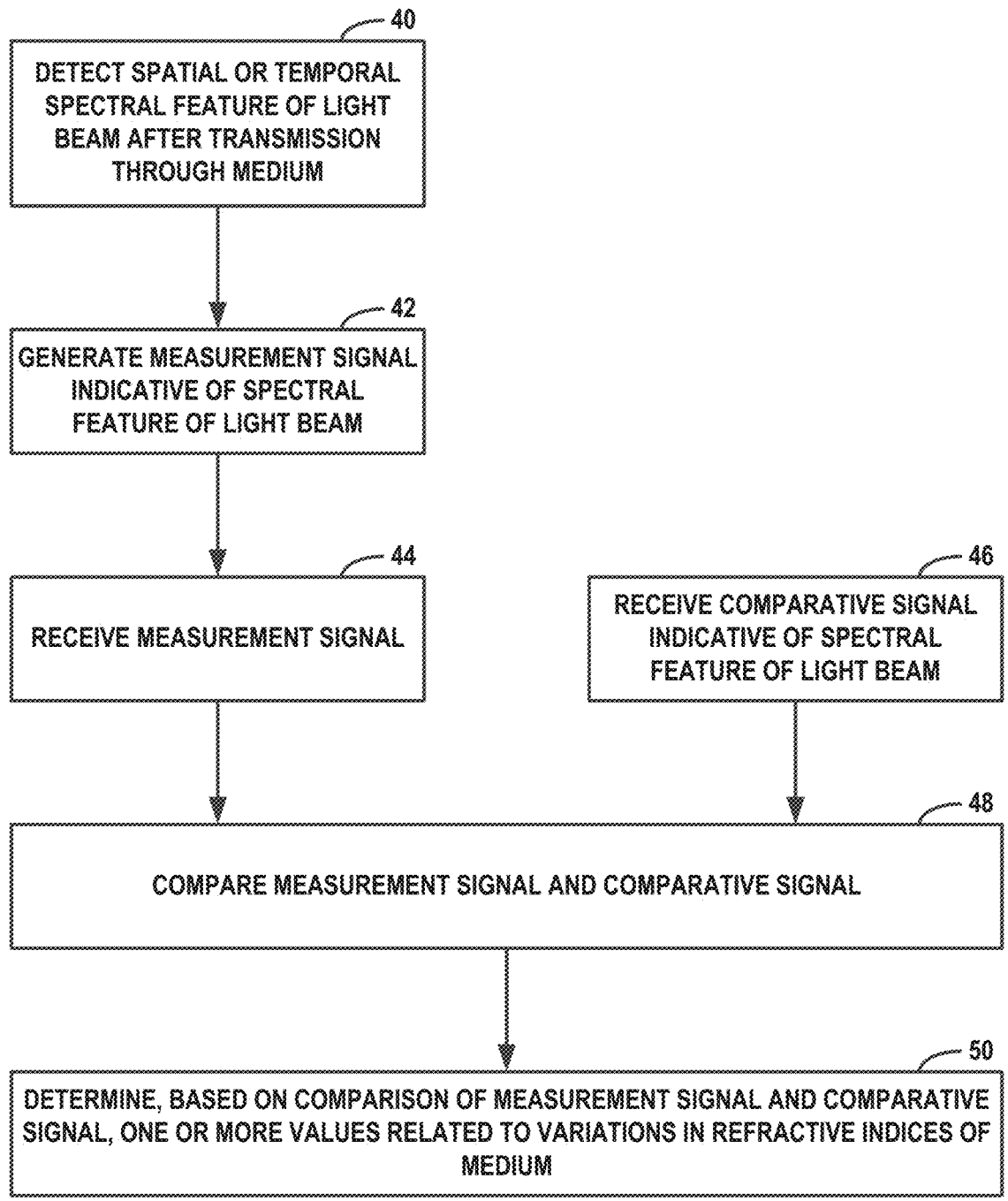
FIG. 5 is a flowchart of an example technique for detecting aberrations in a medium.

FIG. 5 is a flowchart of an example technique for detecting aberrations in a medium. FIG. 5 will reference system 10 of FIG. 1A; however, it will be understood that other systems may be used.

Detector 20 may detect a spatial or temporal spectral feature of a light beam after transmission through a turbulent or aberrated medium 18 (40). For example, after light beam 20 has travelled through medium 18 and, optionally, optical cavity 28 and/or bandpass filter 30, cavity-filtered and/or bandpass-filtered 36 may include spatial and/or temporal features that may indicate spatial and/or temporal aberrations in medium 18. Detector 20 may generate a measurement signal indicative of the spectral feature of the light beam after transmission through medium 18 (42).

Computing device 14 may receive the measurement signal (44) and a comparative signal indicative of a spectral feature of light beam 20 prior to (e.g., light beam 20) or after (e.g., aberrated light beam 32 or cavity-filtered light beam 34) transmission of light beam 20 through medium 18 (46). Computing device 20 may compare the measurement signal and the comparative signal (48) and determine, based on the comparison of the measurement signal and the comparative signal, one or more values related to variations in refractive indices of medium 18 (50).

In some examples, the spectral feature of light beam 20 indicated by the measurement signal includes an intensity of light beam 20 at one or more spatial or temporal frequencies after transmission of light beam 20 through medium 18 and bandpass filter 34 (e.g., bandpass-filtered light beam 36), while the spectral feature of light beam 20 indicated by the comparative signal includes an intensity of the light beam prior to transmission of the light beam through bandpass filter 34 (e.g., aberrated light beam 32 or cavity-filtered light beam 34). As such, a comparison of the spectral feature of the measurement signal and the comparative signal by computing device 14 may include a ratio of the intensity of light beam 20 after transmission through medium 18 and bandpass filter 30 to the intensity of light beam 20 prior to transmission through bandpass filter 30.

In some examples, the spectral feature of light beam 20 indicated by the measurement signal includes an intensity of light beam 20 at one or more spatial or temporal frequencies after transmission through medium 18, optical cavity 28, and bandpass filter 30 (e.g., cavity-filtered and bandpass-filtered light beam 36), while the spectral feature of light beam 20 indicated by the comparative signal includes an intensity of light beam 20 prior to transmission of light beam 20 through bandpass filter 30. As such, the comparison of the spectral feature of the measurement signal and the comparative signal by computing device 14 may include a ratio of the intensity of light beam 20 after transmission through medium 18, optical cavity 28, and bandpass filter 30 to the intensity of light beam 20 prior to transmission through bandpass filter 30.

In some examples, the spectral feature of light beam 20 indicated by the measurement signal includes a phase or phases of light beam 20 after transmission through medium 18 (e.g., aberrated light beam 32, cavity-filtered light beam 34, and/or cavity-filtered and/or bandpass-filtered and cavity-filtered light beam 36), while the spectral feature of light beam 20 indicated by the comparative signal includes a phase or phases of light beam 20 prior to transmission through medium 18. As such, the comparison of the spectral feature of the measurement signal and the comparative signal by computing device 14 includes a phase delay or variation of the phase or phases of light beam 20 after transmission through medium 18 from the phase or phases of light beam 20 prior to transmission through medium 18.

EXAMPLES

Figure 6A:
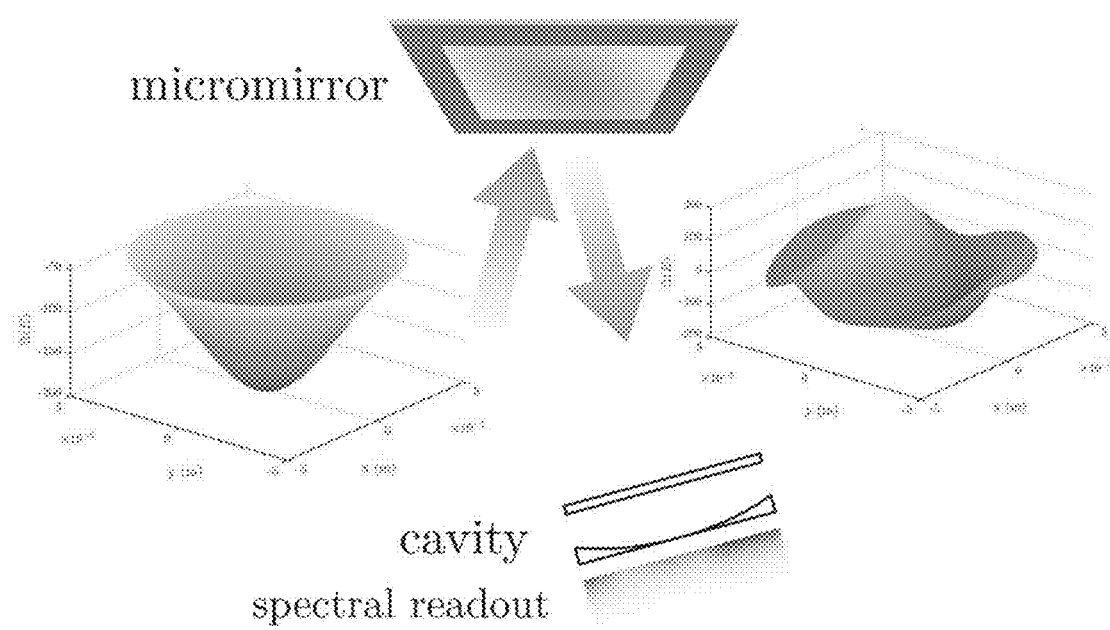
FIG. 6A is a diagram illustrating an example system for detecting optical aberrations caused by a micromirror using an optical cavity.

FIG. 6A is a diagram illustrating an example system for detecting optical aberrations caused by a micromirror using an optical cavity. The system of FIG. 6A includes a micromirror that acts as a medium. A laser reflects off the micromirror and enters an optical cavity. The spatial distribution of the intensity of the reflected laser is captured by a spectral readout.

Different aberrations in a wavefront have different spectral signatures. Optical aberrations may impact the point spread function or resolution of an optical system. During propagation through turbulent media, these degradations can become so critical that active adaptive optics become necessary to correct for them, as is seen in all modern astronomical telescopes. An understanding of such spectral features has very high value to the most advanced diffraction-limited optical systems because it can be used to analyze errors in real time, identifying misalignments and correcting for aberrations induced by thermal expansion or turbulence.

The Laguerre-Gaussian modes are the mutually orthogonal eigenmodes of a circularly-symmetric optical resonator. It follows that any field $E_{in}$ can be decomposed into the Laguerre-Gaussians that it would excite in such a resonator. Each transverse mode corresponds to a (degenerate) resonant frequency. A measurement of an aberrated wavefront may be decomposed into fundamental cavity modes using an aberrated mirror experiment depicted in FIG. 6A, which may be similar to that for a wavefront aberrated by turbulence. A pure Laguerre-Gaussian mode 0, 0 beam, with a waist size comparable to that of the section of wavefront to be analyzed and a wavelength of 1 μm, is assumed to be incident upon our system.

Figure 6B:
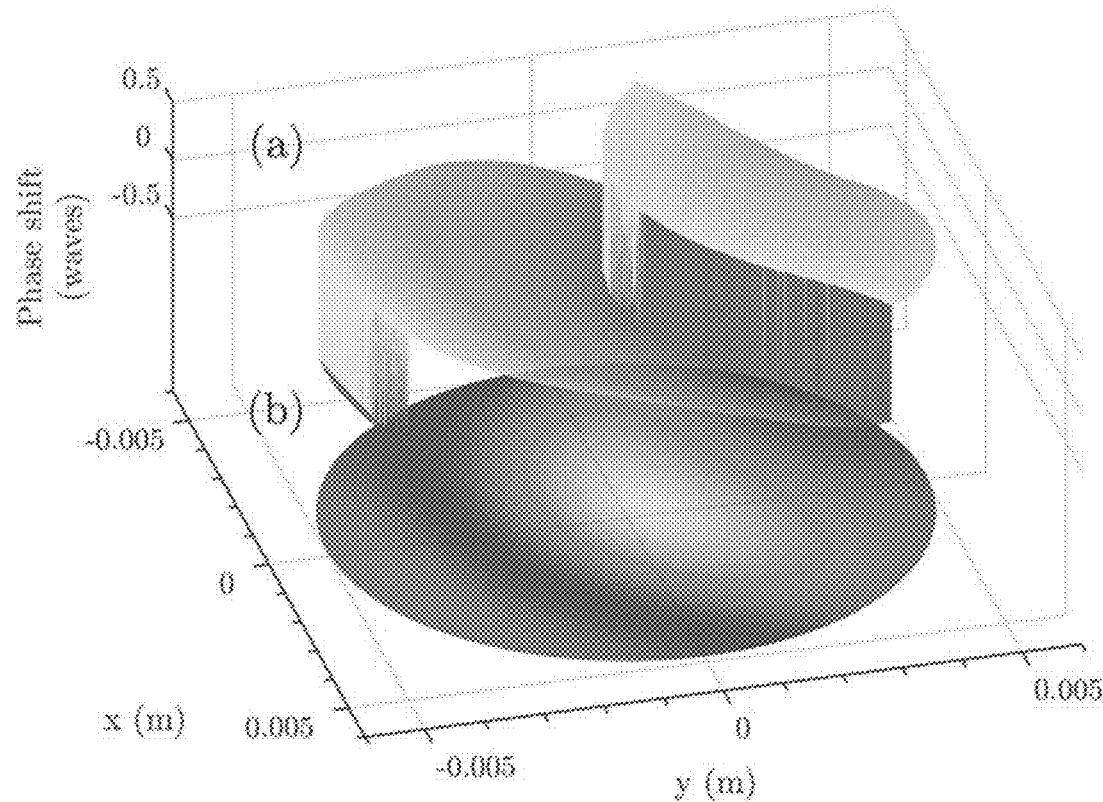
FIG. 6B is a graph illustrating a spatial distribution of a phase front of the example system of FIG. 6A.

FIG. 6B is a graph illustrating a spatial distribution of a phase front of the example system of FIG. 6A. The encounter with the micromirror imparts to the reflected beam a phase delay dependent upon the aberration magnitude, as visualized in FIG. 6B. The so-aberrated beam then enters an optical resonator—specified as highly compatible with the original incident mode, for ease of comparison—and is translated into its modes.

Figure 6C:
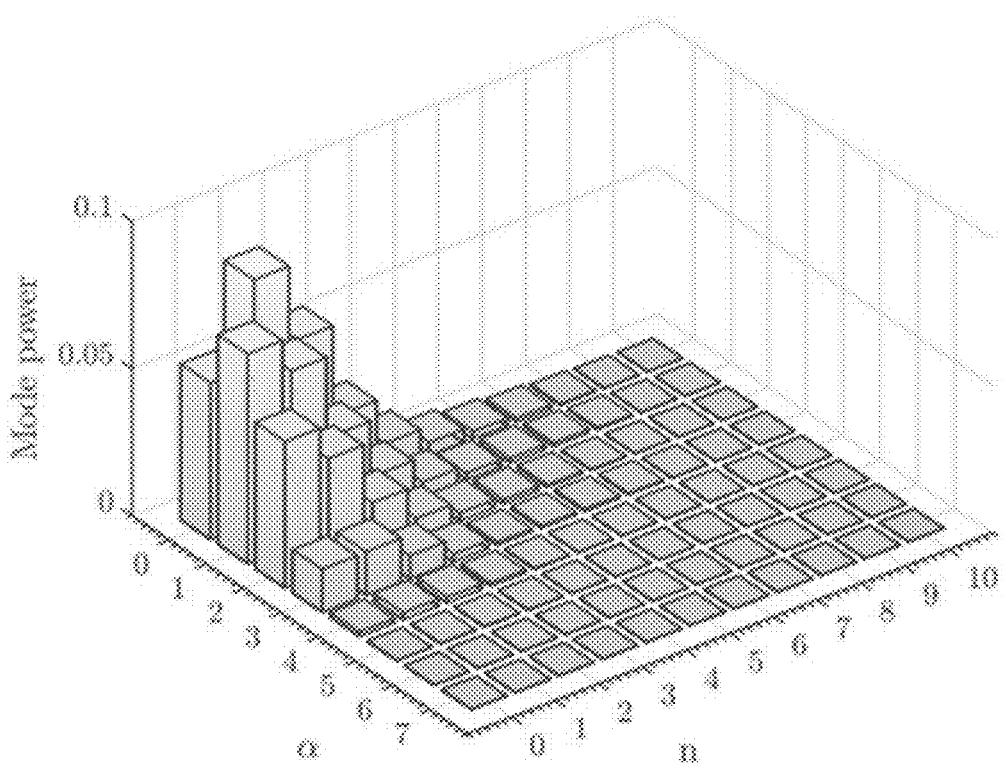
FIG. 6C is a graph illustrating a spatial distribution of power in excited optical cavity modes of the reflected beam of FIG. 6A.

FIG. 6C is a graph illustrating a spatial distribution of power in excited modes of the reflected beam. The power present in each excited mode, calculated from the complex mode decomposition coefficients, is plotted in FIG. 6B. The mirror (aberration) height varies by a maximum of about 1.5 μm in the sampled area, which is sufficient to broadly redistribute the incident optical power amongst certain higher order modes.

Figure 6D:
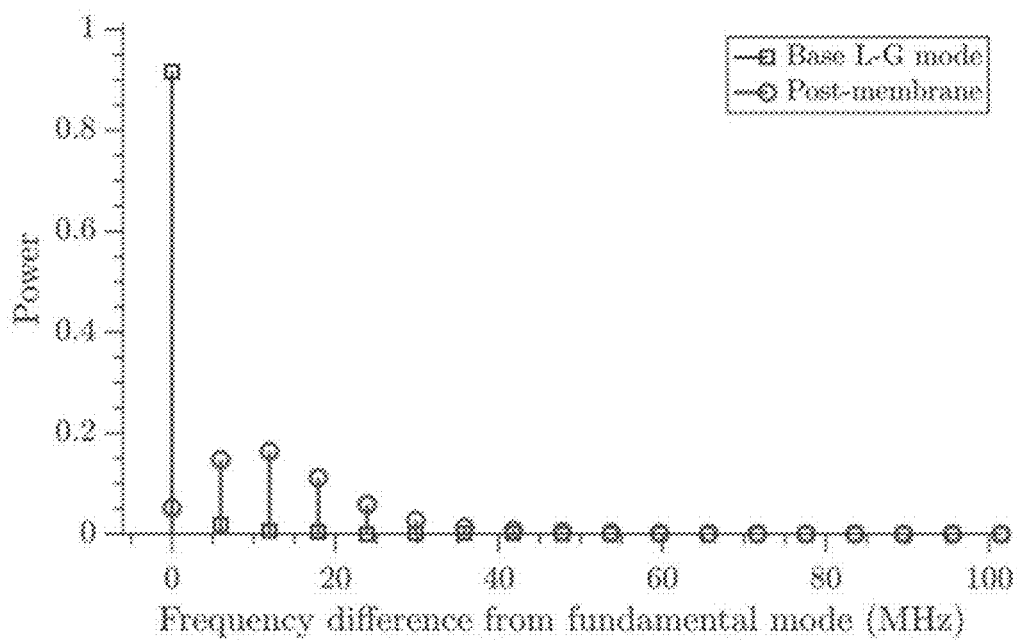
FIG. 6D is a graph of intensity versus resonant frequencies of the optical cavity of FIG. 6A.

FIG. 6D is a graph of intensity versus resonant frequencies of the optical cavity of FIG. 6A. The cavity transmission spectra peaks, calculated from the mode power distribution, are shown in FIG. 6D. The concentration of power is shown to spread and shift upward in frequency from the original fundamental mode. An intentionally aberrated cavity could be used to reduce the loss or obscuration of information by mode degeneracy and translate such spectral changes into phasefront knowledge.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise random-access memory (RAM), read-only memory (ROM), electrically erasable programmable read-only memory (EEPROM), compact disc read-only memory (CD-ROM), or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc, laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSP's), general purpose microprocessors, application specific integrated circuits (ASIC's), field programmable logic arrays (FPGA's), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of IC's (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A system, comprising:
   an optical cavity;
   one or more detectors configured to:
   detect an intensity of a spectral region of a light beam after transmission of the light beam through a turbulent or aberrated medium and the optical cavity; and
   generate a measurement signal indicative of the intensity of the spectral region; and
   a computing device configured to:
   receive, from at least one of the one or more detectors, a first measurement signal indicative of an intensity of a first spectral range of spatial or temporal frequencies of a first spectral region of the light beam;
   receive, from at least one of the one or more detectors, a second measurement signal indicative of an intensity of a second spectral range of spatial or temporal frequencies of a second spectral region of the light beam, different from the first spectral range;
   compare the first measurement signal and the second measurement signal; and
   determine, based on the comparison of the first measurement signal and the second measurement signal, one or more values related to variations in a refractive index of the medium.

2. The system of claim 1,
   wherein the intensity of the light beam indicated by the first measurement signal comprises an intensity of one or more resonant modes of a phase of the light beam at the first spectral range after transmission through the medium and the optical cavity,
   wherein an intensity of the light beam indicated by the second measurement signal comprises an intensity of one or more resonant modes of a phase of the light beam at the second spectral range after transmission through the medium and the optical cavity, and
   wherein the comparison of the of the first measurement signal and the second measurement signal indicates a phase delay of the phase of the light beam after transmission through the medium from the phase of the light beam prior to transmission through the medium.

3. The system of claim 1, wherein at least one detector of the one or more detectors further comprises a spectral filter configured to:
   receive the light beam after transmission through the medium;
   transmit light of the light beam within the first spectral range; and
   attenuate light of the light beam outside the first spectral range.

4. The system of claim 1, wherein a light source of the light beam comprises background light.

5. The system of claim 1,
   wherein the intensity of the light beam indicated by the first measurement signal comprises an intensity of the light beam at the first spectral range after transmission of the light beam through the medium, the optical cavity, and a spectral filter,
   wherein the intensity of the light beam indicated by the second measurement signal comprises an intensity of the light beam at the second spectral range prior to transmission of the light beam through the spectral filter, and
   wherein the comparison of the intensity of the first measurement signal and the second measurement signal comprises a ratio of the intensity of the light beam after transmission through the medium, the optical cavity, and the spectral filter to the intensity of the light beam prior to transmission through the spectral filter.

6. The system of claim 5, wherein the spectral filter is first a bandpass filter.

7. The system of claim 1, wherein the computing device is further configured to:
receive, from a light source of the light beam, a reference frequency of the light beam prior to transmission through the medium; and
adjust, based on the reference frequency of the light beam, the first measurement signal.

8. The system of claim 7, wherein the computing device is further configured to output, based on the reference frequency of the light beam, a correction signal configured to reduce a difference between a frequency of the first measurement signal and the reference frequency.

9. The system of claim 1, further comprising a light distribution device configured to direct a first portion of the light beam to a first detector of the one or more detectors and a second portion of the light beam to a spectral filter.

10. The system of claim 9, further comprising a collection lens configured to concentrate the light beam to the light distribution device.

11. The system of claim 1, further comprising a light source configured to generate the light beam.

12. The system of claim 11, wherein the light source comprises a narrowband laser configured to generate the light beam.

13. The system of claim 11, wherein the light source comprises a broadband laser configured to generate the light beam.

14. The system of claim 1,
wherein the optical cavity is configured to split each of the first measurement signal and the second measurement signal into one or more spectral frequencies, and
wherein the one or more detectors are further configured to detect an intensity of each frequency of the one or more spectral frequencies.

15. The system of claim 14,
wherein the optical cavity is a resonant optical cavity, and
wherein the one or more spectral frequencies comprise at least one resonant frequency of the resonant optical cavity.

16. The system of claim 14,
wherein the medium is a fluid medium, and
wherein the computing device is further configured to determine, based on the variations in refractive indices, one or more properties of turbulence of the fluid medium.

17. The system of claim 14, wherein the one or more properties of turbulence include at least one of an intensity of the turbulence, a type of the turbulence, a size of eddies, Fried parameters, Greenwood frequencies, changes in density, stability of flow lines, onset of flow line detachment or stall, or analysis of vortices or lift.

18. A method, comprising:
detecting, using one or more detectors, an intensity a first spectral region of a light beam at a first spectral range of spatial or temporal frequencies after transmission through a turbulent or aberrated medium and an optical cavity;
detecting, using the one or more detectors, an intensity of a second spectral region of a light beam at a second spectral range of spatial or temporal frequencies
generating, by at least one detector of the one or more detectors, a first measurement signal indicative of the first spectral region of the light beam and a second measurement signal indicative of the second spectral region of the light beam;
receiving, by a computing device, the first measurement signal and the second measurement signal;
comparing, by the computing device, the first measurement signal and the second measurement signal; and
determining, by the computing device and based on the comparison of the first measurement signal and the second measurement signal, one or more values related to variations in a refractive index of the medium.

19. The method of claim 18,
wherein the intensity of the light beam indicated by the first measurement signal comprises an intensity of one or more resonant modes of a phase of the light beam at the first spectral range after transmission through the medium and the optical cavity,
wherein an intensity of the light beam indicated by the second measurement signal comprises an intensity of one or more resonant modes of a phase of the light beam at the second spectral range after transmission through the medium and the optical cavity, and
wherein the comparison of the first measurement signal and the second measurement signal indicates a phase delay of the phase of the light beam after transmission through the medium from the phase of the light beam prior to transmission through the medium.

20. The method of claim 18, wherein at least one detector of the one or more detectors further comprises a spectral filter, and further comprising:
receiving, by the spectral filter, the light beam after transmission through the medium and the optical cavity;
transmitting, by the spectral filter, light of the light beam within the first spectral range; and
attenuating, by the spectral filter, light of the light beam outside the first spectral range.

21. The method of claim 18, further comprising generating the light beam.

22. The method of claim 18, further comprising directing, using a light distribution device, a first portion of the light beam to a first detector of the one or more detectors and a second portion of the light beam to a spectral filter.

23. The method of claim 22, further comprising concentrating, using a collection lens, the light beam to the light distribution device.

24. The method of claim 18,
wherein the intensity of the light beam indicated by the first measurement signal comprises an intensity of the light beam at the first spectral range after transmission of the light beam through the medium, the optical cavity, and a spectral filter,
wherein the intensity of the light beam indicated by the second measurement signal comprises an intensity of the light beam at the second spectral range prior to transmission of the light beam through the spectral filter, and
wherein the comparison of the intensity of the first measurement signal and the second measurement signal comprises a ratio of the intensity of the light beam after transmission through the medium, the optical cavity, and the spectral filter to the intensity of the light beam prior to transmission through the spectral filter.

25. The method of claim 24,
wherein the spectral filter is a bandpass filter.

26. The method of claim 18, further comprising:
splitting, using the optical cavity, each of the first measurement signal and the second measurementsignal into one or more spectral frequencies; and
detecting, by the one or more detectors, an intensity of each frequency of the one or more spectral frequencies.

27. The method of claim 26,
wherein the optical cavity is a resonant optical cavity, and
wherein the one or more spectral frequencies comprise at least one resonant frequency of the resonant optical cavity.

28. The method of claim 18, wherein the medium is a fluid medium, and further comprising determining, by the computing device and based on the variations in refractive indices, one or more properties of turbulence of the fluid medium.

29. The method of claim 28, wherein the one or more properties of turbulence include at least one of an intensity of the turbulence, a type of the turbulence, a size of eddies, Fried parameters, Greenwood frequencies, changes in density, stability of flow lines, onset of flow line detachment or stall, or analysis of vortices or lift.

30. The method of claim 18, further comprising:
receiving, by the computing device and from a light source of the light beam, a reference frequency of the light beam prior to transmission through the medium; and
adjusting, by the computing device and based on the reference frequency of the light beam, the first measurement signal.

31. The method of claim 30, further comprising outputting, based on the reference frequency of the light beam, a correction signal configured to reduce a difference between a frequency of the first measurement signal and the reference frequency of the light beam.

* * * * *